United States Patent
Ho

(10) Patent No.: US 8,433,918 B2
(45) Date of Patent: Apr. 30, 2013

(54) METHODS AND SYSTEMS FOR IMPROVING THE SECURITY OF PASSWORD-BASED AUTHENTICATION PROTOCOLS FOR IEEE 802.11 NETWORKS

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 260 days.

(21) Appl. No.: 12/896,243

(22) Filed: Oct. 1, 2010

(65) Prior Publication Data
US 2011/0087884 A1    Apr. 14, 2011

Related U.S. Application Data

(60) Provisional application No. 61/251,546, filed on Oct. 14, 2009.

(51) Int. Cl.
*G06F 21/00*      (2006.01)

(52) U.S. Cl.
USPC .......... 713/184; 726/1; 726/4; 726/6; 380/28; 380/30; 713/155; 713/166; 713/168; 709/229; 455/410; 705/44

(58) Field of Classification Search ................ 713/168, 713/184
See application file for complete search history.

(56) References Cited

U.S. PATENT DOCUMENTS

| | | | | |
|---|---|---|---|---|
| 7,076,656 B2* | 7/2006 | MacKenzie | ................ | 713/171 |
| 7,895,436 B2* | 2/2011 | Imai et al. | ................ | 713/169 |
| 7,978,846 B2* | 7/2011 | Ozturk et al. | ................ | 380/30 |
| 2001/0055388 A1* | 12/2001 | Kaliski, Jr. | ................ | 380/30 |
| 2002/0067832 A1* | 6/2002 | Jablon | ................ | 380/277 |
| 2004/0243824 A1* | 12/2004 | Jones | ................ | 713/200 |
| 2006/0288407 A1* | 12/2006 | Naslund et al. | ................ | 726/9 |
| 2007/0150794 A1* | 6/2007 | Naslund et al. | ................ | 714/781 |
| 2007/0266258 A1* | 11/2007 | Brown et al. | ................ | 713/183 |
| 2009/0164774 A1* | 6/2009 | Sherkin | ................ | 713/155 |

OTHER PUBLICATIONS

Abi-Char et al., "A Secure Authenticated Key Agreement Protocol Based on Elliptic Curve Cryptography", Information Assurance and Security, 2007. IAS 2007. Third International Symposium on, Date of Conference: Aug. 29-31, 2007, pp. 89-94.*

Ho, Jin-Meng, "SAE Protocols—Flaws and Fixes," IEEE 802.11-10/0119r2, dated Jan. 18, 2010, posted Jan. 27, 2010.

(Continued)

*Primary Examiner* — Morshed Mehedi
(74) *Attorney, Agent, or Firm* — Steven A. Shaw; W. James Brady; Frederick J. Telecky, Jr.

(57) ABSTRACT

A password element is generated for a station running an Elliptic Curve Cryptography (ECC) or a Finite Field Cryptography (FFC) group based password authenticated protocol. A password element is multiplied by a cofactor to generate a modified password element for the ECC group. The station verifies that the modified password element is not equal to a point at infinity for the ECC group. A password element is generated by exponentiating a password value to a power t, where t=(p−1)/r, p and r are primes, and r has a bit length of at least 160 bits for the FFC group. A commit-element parameter is generated using a temporary secret value and the ECC modified password element or the FFC password element, and is then transmitted to another station in a commit message. The receiving station checks if the received commit-element parameter has desired properties before continuing with the protocol.

8 Claims, 3 Drawing Sheets

OTHER PUBLICATIONS

IEEE, "Draft Standard for Information Technology—Telecommunications and information exchange between systems—Local and Metropolitan area networks—Specific requirements," IEEE P802,11s/D3.03, Jul. 2009.

IEEE, "Draft Standard for Information Technology—Telecommunications and information exchange between systems—Local and Metropolitan area networks—Specific requirements," IEEE P802,11s/D4.0, Dec. 2009.

IEEE, "Draft Standard for Information Technology—Telecommunications and information exchange between systems—Local and Metropolitan area networks—Specific requirements," IEEE P802,11s/D7.0, Jul. 2010.

National Institute of Standards and Technology (NIST), "Federal Information Processing Standards Publication; Digital Signature Standards (DSS)," FIPS PUB 186-3, Jun. 2009.

National Institute of Standards and Technology (NIST), "Recommendation for Pair-Wise Key Establishment Schemes Using Discrete Logarithm Cryptography (Revised)," NIST Special Publication 800-56A, Mar. 2007.

Internet Assigned Numbers Authority (IANA), "Interent Key Exchange (IKE) Attributes—per RFC 2409," Jun. 14, 2010.

Ho, Jin-Meng, "SAE Protocols—Flaws and Fixes," IEEE 802.11-10/0119r1, dated Jan. 18, 2010, posted Jan. 20, 2010.

Ho, Jin-Meng, "SAE Protocols—Flaws and Fixes," IEEE 802.11-10/0119r0, dated Jan. 18, 2010, posted Jan. 19, 2010.

Harkins, Dan, "Simultaneous Authentication of Equals: A Secure Password-Based Key Exchange for Mesh Networks." The Second International Conference on Sensor Technologies and Applications, (SENSORCOM 2008), (6 pages), 2008.

\* cited by examiner

METHODS AND SYSTEMS FOR IMPROVING THE SECURITY OF PASSWORD-BASED AUTHENTICATION PROTOCOLS FOR IEEE 802.11 NETWORKS

CROSS-REFERENCE TO RELATED APPLICATIONS

The present application claims the benefit of the filing date of pending U.S. provisional application No. 61/251,546, titled "Methods for Fixing IEEE 802.11 Password Based Authentication Protocols," filed Oct. 14, 2010, the disclosure of which is hereby incorporated by reference herein in its entirety.

TECHNICAL FIELD

Embodiments of the invention are directed, in general, to password-authenticated key exchange protocols and, more specifically, to remedies for security flaws in the Simultaneous Authentication of Equals (SAE) protocols specified through IEEE 802.11s for IEEE 802.11 networks.

BACKGROUND

Two password-authenticated key exchange protocols, called Simultaneous Authentication of Equals (SAE), are under consideration for inclusion in the IEEE Standard 802.11. The SAE protocols provide mutual authentication and master key establishment between two stations sharing a password. The SAE protocols are described, for example, in the publication IEEE 802.11s/D7.0, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 1: Mesh Networking;" dated July 2010. The SAE protocols are also described in earlier IEEE 802.11s draft specifications, including IEEE 802.11s/D4.0 (December 2009) and IEEE 802.11s/D3.03 (July 2009). The notation used to describe the SAE protocols and the operations used to generate certain SAE parameters varies among these draft specifications. The disclosures of the above-cited draft specifications—IEEE 802.11s/D7.0 (July 2010), IEEE 802.11s/D4.0 (December 2009), and IEEE 802.11s/D3.03 (July 2009)—are hereby incorporated by reference herein in their entirety.

SUMMARY OF THE INVENTION

Embodiments of the invention provide remedies or improvements to the proposed SAE protocols. Both SAE protocols, as proposed in the draft specifications 802.11s/D4.0 and IEEE 802.11s/D3.03, are vulnerable to off-line dictionary and impersonation attacks and have flawed assumptions as well. The invention provides remedies for the flaws in the proposed SAE protocols and thereby improves the security of communications between network stations using the SAE protocols. The fixes for the SAE protocol flaws were also presented in a document identified as document IEEE 802.11-10/0119r2 "SAE Protocols—Flaws and Fixes," dated 2010-01-18, the disclosure of which is hereby incorporated by reference herein in its entirety. In general, the SAE protocols can be improved by implementing one or more of the following features.

When selecting an Elliptic Curve Cryptography (ECC) group for use in the SAE protocols, the ECC group should have an order that is prime and, therefore, a cofactor, h, equal to one (h=1).

If an ECC group having a cofactor greater than one (h>1) is selected, the password element (PWE), as defined in the SAE protocol, is multiplied by the cofactor h to create a new term, N, defined as N=h*PWE and referred to as the modified password element subsequently. The SAE-defined commit-element must be generated using this modified PWE. The modified PWE must be checked to determine if it is equal to a point at infinity, O, for the selected ECC group (N=h*PWE=O). If the modified PWE is equal to the point at infinity, then a new PWE must be generated and verified until N is not equal to O.

For ECC groups in which the cofactor is greater than one (h>1), each station must check that a commit-element received from another station complies with the requirement that h*commit-element≠O, where O is the point at infinity for the selected ECC group. The station proceeds with the SAE protocol only if this check passes.

When Finite Field Cryptography (FFC) groups are used in the SAE protocols, the password element (PWE) is generated by exponentiating a password value (pwd-value) to the value (p−1)/r, modulo p (i.e., PWE=pwd-value$^{(p-1)/r}$ modulo p), where p defines the prime field and r is the order (of PWE). To strengthen the FFC-based SAE protocol, the prime p must be selected such that r is also a prime and has a minimum bit length of 160 bits.

For FFC groups, the commit-element received from another station must fit the requirement that (commit-element)$^r$ modulo p≠1. A receiving station must discard the received message if this check fails.

BRIEF DESCRIPTION OF THE DRAWINGS

Figure 1:
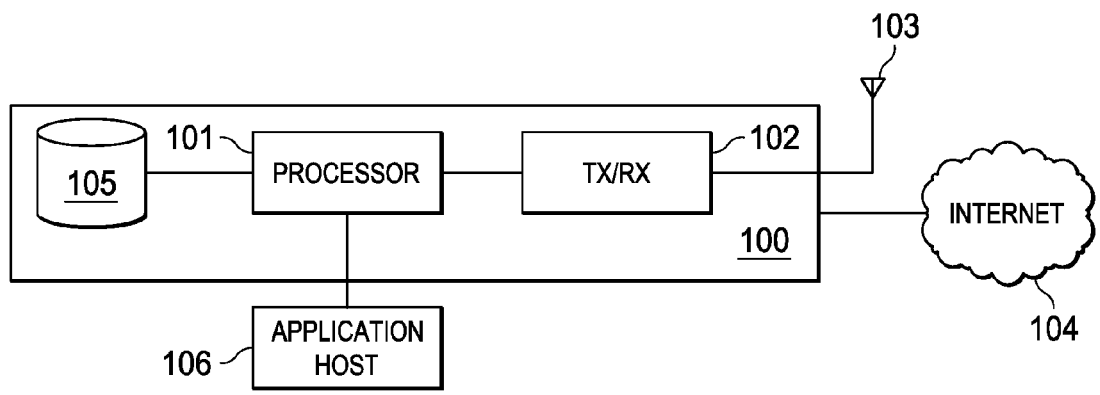
Figure 2:
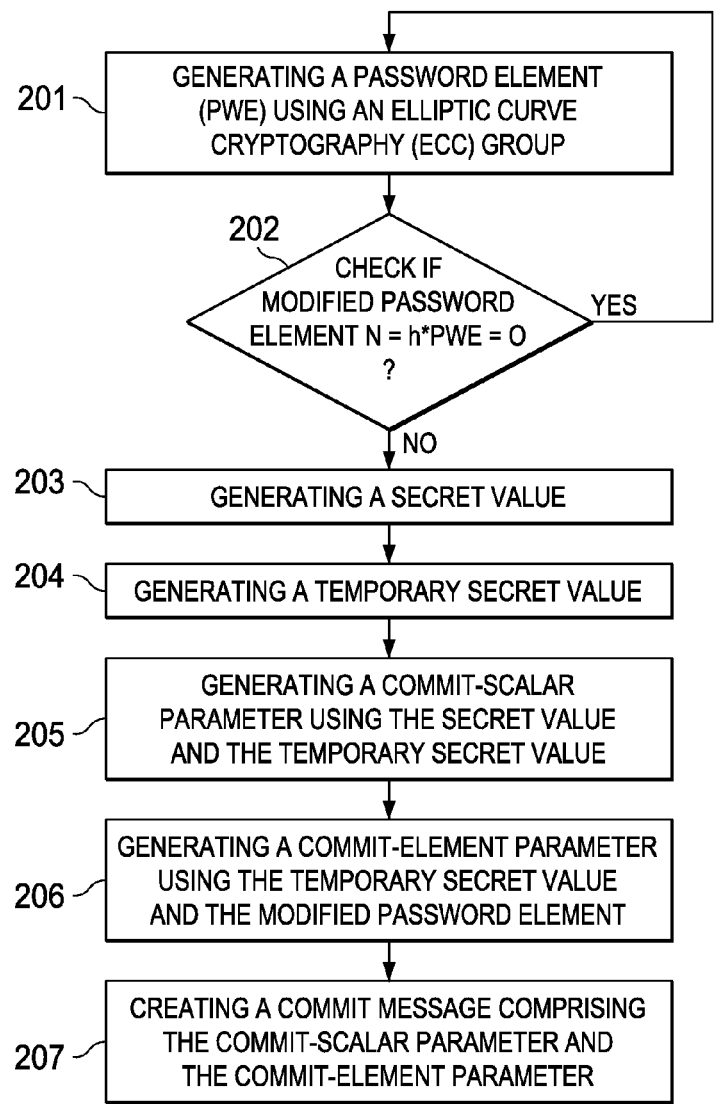
Figure 3:
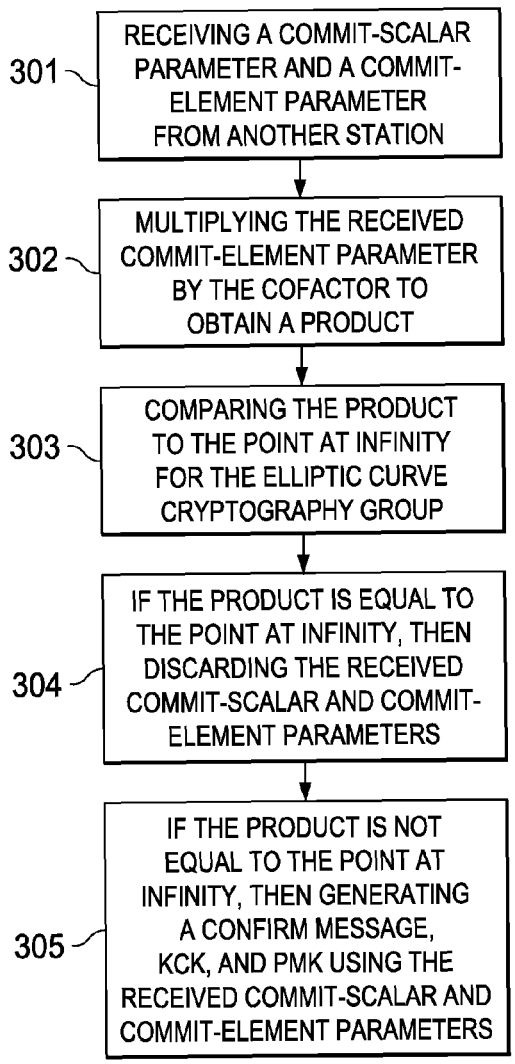
Figure 4:
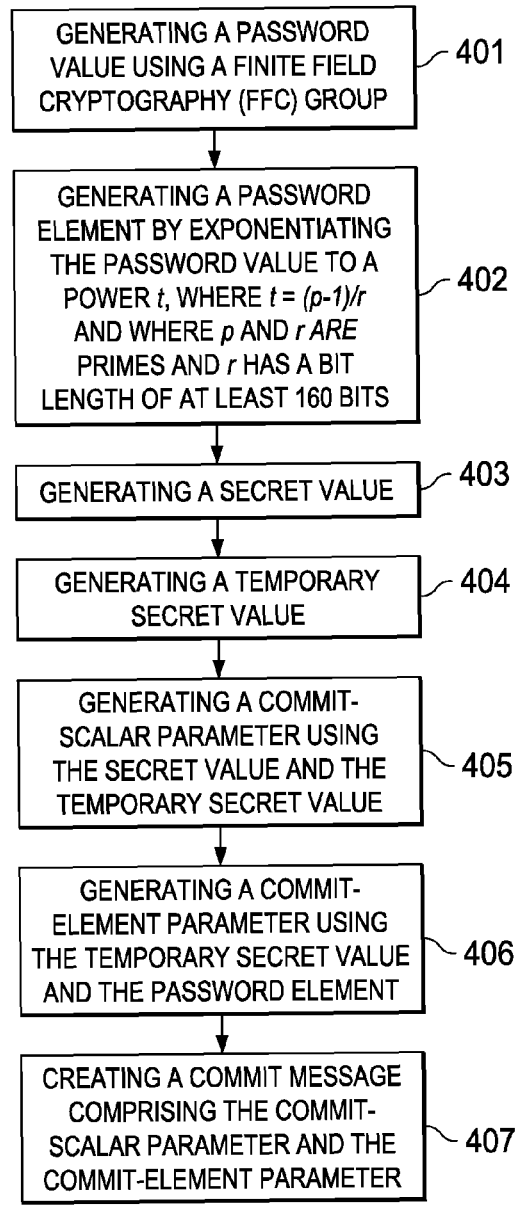
Figure 5:
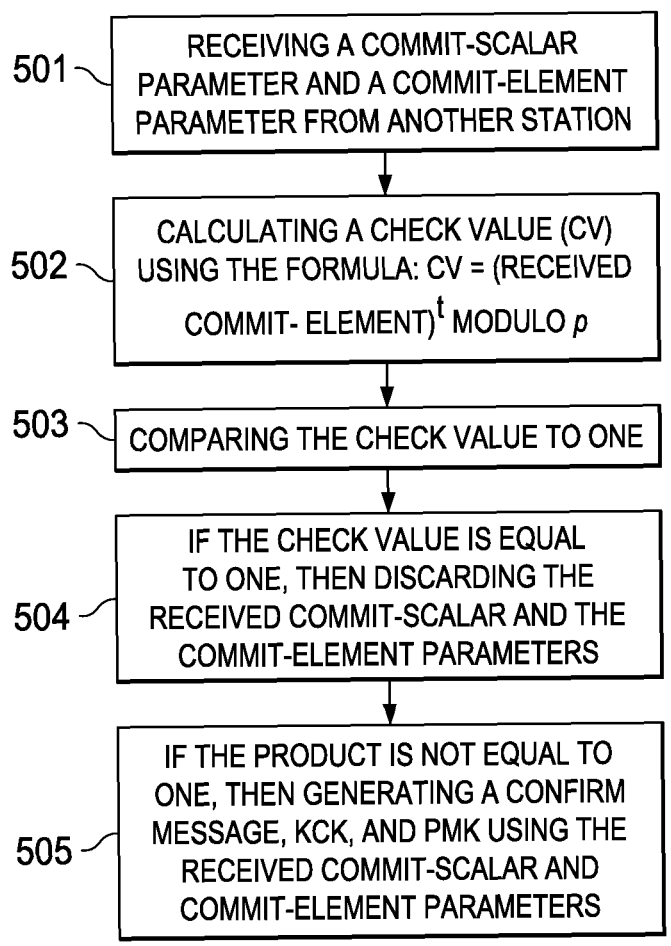

Having thus described the invention in general terms, reference will now be made to the accompanying drawings, wherein:

FIG. 1 is a block diagram of an exemplary embodiment of a network station implementing embodiments of the invention;

FIG. 2 is a flowchart illustrating one embodiment for generating a commit message used in an SAE protocol using an Elliptic Curve Cryptography (ECC) group;

FIG. 3 is a flowchart illustrating one embodiment for verifying a commit message received from another network station using an EEC group;

FIG. 4 is a flowchart illustrating one embodiment for generating a commit message used in an SAE protocol using a Finite Field Cryptography (FFC) group; and FIG. 5 is a flowchart illustrating one embodiment for verifying a commit message received from another network station using an FFC group.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The SAE protocols are variants of basic Diffie-Hellman key exchange protocols by which each party derives public and private keys with respect to a particular set of domain parameters that define a finite cyclic group. Groups can be based either on Finite Field Cryptography (FFC) or on Elliptic Curve Cryptography (ECC). For FFC, a finite cyclic group is a multiplicative group of the integers modulo a prime p. For ECC, a finite cyclic group is a group of points on an underlying elliptic curve defined over a prime field, where the prime is also designated asp. The SAE protocols are in the category of zero-knowledge password proofs, which, if designed correctly, resist off-line dictionary attacks that often plague password-based authentication protocols. However, the SAE protocol as described in the IEEE 802.11s/D4.0 and D3.03 draft standards are vulnerable to such attacks. Without taking additional steps, the proposed SAE protocols are susceptible to an off-line dictionary attack. An attacker who impersonates a legitimate party and runs either of the SAE protocols with another legitimate party solicits the response to its chosen message and has all the information needed to run through a dictionary of potential passwords until the correct one is found. The proposed SAE protocols are also vulnerable to man-in-the middle attacks that would be otherwise thwarted by correctly designed password authenticated key exchange protocols.

Each SAE protocol consists of two message exchanges between peer stations: a commitment exchange and a confirmation exchange. Upon discovery of another station, each peer station generates a password element (PWE) using both stations' identities (i.e., the stations' MAC addresses) and a shared password. The process for generating the PWE depends upon whether an FFC or ECC group has been selected. The draft specifications IEEE 802.11s/D7.0 and IEEE 802.11w/D3.03 identified above, and incorporated herein by reference, define the PWE-generation processes for both FFC and ECC, which, however, is not cryptographically complete and contributes to the aforementioned vulnerabilities of the SAE protocols. Additionally, each station generates a secret value, rand, and a temporary secret value, mask. The values of mask and rand are chosen at random and meet the following conditions: $0<rand<r$ and $0<mask<r$, where r is the order of the selected FFC or ECC group generated by the PWE. The stations each generate a Commit Message consisting of commit-scalar and commit-element components. The commit-scalar component is produced using the rand and mask values; and the commit-element component is produced using the mask and PWE values.

The Commit Message is transmitted to the peer station, which verifies the received commit-scalar and commit-element components. The above-referenced IEEE 802.11s draft specifications disclose that validation of commit-element depends on whether the PWE is selected from an ECC or FFC group. For an FFC group, the value of commit-element must be between zero and p (i.e., $0<commit-element<p$), and the scalar operation on the commit-element with the order of the group, r, must equal one (i.e., scalar-op(r, commit-element) =1). If either of those conditions does not hold, then the commit-element validation fails; otherwise, the validation succeeds. For an ECC group, both the x- and y-coordinates of the commit-element must be less than p, and the two coordinates must form a valid point on the chosen elliptic curve. If either of those conditions does not hold, then the commit-element validation fails; otherwise, the validation succeeds.

If either of the commit-scalar validation or commit-element validation fails, the station must discard the peer's message. If both the commit-scalar and commit-element are successfully validated, a shared secret element is derived using the received commit-scalar and commit-element values and the station's secret value, rand, as described in the 802.11s draft specifications. The shared secret element is used to derive a key confirmation key (KCK) and a pairwise master key (PMK). The KCK is then used to generate a Confirm Message. The Confirm Message is transmitted to the peer station, which verifies the message. If each station successfully verifies the other station's Confirm Message, then the stations may use their shared PMK for future communications.

The SAE protocols disclosed in the IEEE 802.11s draft specifications include certain flaws that expose the stations' Commit Message and Confirm Message for both the ECC and FFC groups to impersonation, dictionary, or brute-force attacks that would allow a third party to discover the password or/and the resulting shared PMK. Additional steps or restrictions must be imposed on the SAE protocols to ensure that the stations' messages are not at risk of manipulation or exploitation by a third party.

More than one ECC group can be configured on a station for use with SAE. The 802.11s draft specifications require that compliant stations support an ECC group defined over a 256-bit prime order field (identified as group nineteen in an Internet Assigned Numbers Authority (IANA) registry) for the purpose of interoperability. However, no restrictions are placed on the selection of other ECC groups that might be used by the stations. According to one embodiment, in order to minimize exposure to third party attacks, the selected ECC groups should have an order, #E, that is prime and, therefore, a cofactor, h, equal to one (h=1). The National Institute of Standards and Technology's (NIST) recommended elliptic curves over prime fields as disclosed in Federal Information Processing Standards Publication (FIPS PUB)186-3, issued June 2009, are in this category and meet the h=1 requirement.

ECC groups having a cofactor greater than one (h>1) may also be used if additional restrictions are taken into consideration. As defined in the IEEE 802.11s/D4.0 draft specification: commit-element=inverse(scalar-op(mask, PWE)). As a preemptive measure, the station must modify the PWE value that is used to generate commit-element by multiplying the PWE value by the cofactor h. A new term, N, may be defined as N=h*PWE. The calculation of the commit-element value then becomes commit-element=inverse(scalar-op(mask, N)). This ensures that N E subgroup of order r and, therefore, validates the assumption that r*N=O, where O is the point at infinity for the selected ECC group, so that both stations derive the same KCK and PMK. An additional remedial step should be taken in connection with this process. Before calculating and sending the commit-element, the station must check to determine if N=h*PWE=O. If the answer to this check is yes, then the station must regenerate a new PWE until N is not equal to O.

For ECC groups in which the cofactor is greater than one (h>1), defensive measures must also be used. Each station must check that the commit-element received from a peer station complies with the requirement that h*commit-element≠O, where O is the point at infinity for the selected ECC group. The station proceeds to calculating the KCK and PMK and sending a confirm message only if this check passes. This check detects and thwarts subgroup confinement attacks on ECC based SAE and, therefore, minimizes offline dictionary attacks on ECC based SAE via impersonation.

Additionally, as an internal check, each station must verify that N=h*PWE≠O for the password element generated by the station itself. If this check fails, then the station must not use the offending PWE to generate commit-element, but must instead generate a new PWE before creating the commit-element for a Commit Message to be sent to a peer station.

For FFC groups, the 802.11s draft specifications disclose generating a password element (PWE) by exponentiating a password value (pwd-value) to the value (p−1)/r, modulo p (i.e., PWE=pwd-value$^{(p-1)/r}$ modulo p), where p defines the prime field and r is the order (of PWE). Other than defining r as the order, there are no restrictions on the value of r in the SAE specifications. As such, r may be a prime or a composite number. To strengthen the FFC based SAE protocol and to protect it against third-party attacks, in one embodiment, the value of r must be selected only from primes p such that p=1+t×r and r is a prime having a bit length of at least 160 bits. This requirement can be rewritten as t=(p−1)/r, so the password element equation can also be rewritten as PWE=(pwd-value)$^{(p-1)/r}$ modulo p=(pwd-value)$^t$ modulo p. Accordingly, embodiments of the invention select primes p for FFC based SAE such that r is also a prime and has a minimum bit length of 160 bits.

In one embodiment, stations using FFC groups take defensive measures by checking if the commit-element received from a peer station fits the requirement: (commit-element)$^r$ modulo p≠1. The station proceeds to calculating the KCK and PMK only if this check passes. The station must discard the received commit-scalar and commit-element if this check fails. This validation of the received commit-element detects and thwarts subgroup confinement attacks on FFC based SAE and prevents offline dictionary attacks via impersonation and MITM attacks on FFC based SAE.

FIG. 1 is a block diagram of an exemplary embodiment of a station 100 implementing embodiments of the invention. Station 100 may communicate with other stations of the same or different configuration and may run an SAE protocol. Processor 101 processes data to be exchanged with other stations via transceiver 102 and antenna 103 and/or via interface to Internet or another network 104. Processor 101 may be implemented by software, firmware, hardware, or a combination thereof. Processor 101 may generate commit-scalar and commit-element parameters, Commit Message and Confirm Message, KCK and PMK, and operate on other values required in the selected SAE protocol. Processor 101 may also generate and process messages sent to, and received from, another station, such as verifying that the received commit-element meets the requirements set forth above to minimize third-party attacks.

Memory 105 may be used to store parameters used in the SAE protocol, such as the mask, rand, commit-element, commit-scalar, KCK, and PMK parameters and the like. For such storage, memory 105 is secured from unauthorized access. Memory 105 may also be any device used to store computer program instructions or any machine readable medium having data stored thereon representing sequences of instructions that are used by processor 101, if applicable. It will be understood that memory 105 may be any applicable storage device, such as a fixed or removable RAM, ROM, flash memory, or disc drive that is separate from or integral to processor 101. Station 100 may be coupled to an application host 106, such as a personal computer, a smart phone, or other devices.

In other embodiments, the SAE protocols and the improvements disclosed herein may be implemented as logic on a hardware device, such as a state-machine-based device that transitions from one state, during which it executes one task, to another state, where it executes another task. In such a device, a process for executing the SAE protocols does not have to be stored as software or firmware instructions, but rather is "hardwired" into the device such as in an Application Specific Integrated Circuit (ASIC) or another component.

FIG. 2 is a flowchart illustrating one embodiment for generating a commit message used in an SAE protocol using an EEC group. In step 201, a password element is generated using an EEC group. In step 202, the station checks to determine if the modified PWE N=h*PWE=O. If the answer to this check is yes, then the process returns to step 201 and the station regenerates a new PWE. The check in step 202 is run again until a PWE is generated such that N is not equal to O. A secret value is generated in step 203, and a temporary secret value is generated in step 204. A commit-scalar parameter is generated in step 205 using the secret value and the temporary secret value. A commit-element parameter is generated in step 206 using the temporary secret value and the modified password element. In step 207, a commit message comprising the commit-scalar parameter and the commit-element parameter is generated. The commit message is transmitted to another station as part of the SAE protocol.

FIG. 3 is a flowchart illustrating one embodiment for verifying a commit message received from another station running an EEC based SAE protocol. In step 301, a commit-scalar parameter and a commit-element parameter are received from another station. The received commit-element parameter is multiplied by the cofactor h to obtain a product in step 302. In step 303, the product is compared to the point at infinity for the ECC group. If the product is equal to the point at infinity, then the received commit-scalar and commit-element parameters are discarded in step 304. If the product is not equal to the point at infinity, then a confirm message, KCK and PMK are generated in step 305 using the received commit-scalar and commit-element parameters.

FIG. 4 is a flowchart illustrating one embodiment for generating a commit message used in an SAE protocol using an FFC group. In step 401, a password value is generated using an FFC group. A password element is generated by exponentiating the password value to a power t in step 402, where t=(p−1)/r and where p and r are primes and r has a bit length of at least 160 bits. A secret value is generated in step 403, and a temporary secret value is generated in step 404. A commit-scalar parameter is generated in step 405 using the secret value and the temporary secret value. A commit-element parameter is generated in step 406 using the temporary secret value and the password element. In step 407, a commit message is created comprising the commit-scalar parameter and the commit-element parameter. The commit message is transmitted to another station as part of the SAE protocol.

FIG. 5 is a flowchart illustrating one embodiment for verifying a commit message received from another station running an FFC based SAE protocol. A commit-scalar parameter and a commit-element parameter are received from another station in step 501. A check value (CV) is calculated in step 502 using the formula: CV=(received-commit-element)$^r$ modulo p. In step 503, the check value is compared to one. If CV is equal to one, then the received commit-scalar and commit-element parameters are discarded in step 504. If CV is not equal to one, then a confirm message, KCK and PMK are generated in step 505 using the received commit-scalar and commit-element parameters.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method performed by a processor implemented by software, firmware, hardware, or a combination thereof, the method comprising:
generating a password element for a station running a password authenticated key exchange protocol using an Elliptic Curve Cryptography (ECC) group with a cofactor that is greater than one;
multiplying the password element by a cofactor to generate a modified password element;
verifying that the modified password element is not equal to a point at infinity, O, for the ECC group;
generating a temporary secret value;
generating a commit-element parameter using the temporary secret value and the modified password element; and
creating a commit message comprising a commit-scalar parameter and the commit-element parameter.

2. The method of claim 1, further comprising:
if the modified password element is equal to the point at infinity, O, for the ECC group, then generating a new password element for the station;
multiplying the new password element by the cofactor to generate a new modified password element; and
verifying that the new modified password element is not equal to the point at infinity, O.

3. The method of claim 1, further comprising:
receiving a commit-scalar parameter and a commit-element parameter from another station running the password authenticated key exchange protocol;
multiplying the received commit-element parameter by the cofactor to obtain a product;
comparing the product to the point at infinity for the ECC group;
if the product is equal to the point at infinity, then discarding the received commit-scalar and commit-element parameters; and
if the product is not equal to the point at infinity, then generating a confirm message, a key confirmation key, and a pairwise master key using the received commit-scalar and peer-commit-element parameters.

4. A method performed by a processor implemented by software, firmware, hardware, or a combination thereof, the method comprising:
generating a password element for a station running a password authenticated key exchange protocol using an Elliptic Curve Cryptography (ECC) group, the ECC group selected to have an order that is a prime and a cofactor that is equal to one;
generating a temporary secret value;
generating a commit-element parameter using the temporary secret value and modified password element;
generating a commit-scalar parameter; and
creating a commit message comprising the commit-scalar parameter and the commit-element parameter.

5. A device running a password authenticated key exchange protocol using an Elliptic Curve Cryptography (ECC) group, comprising:
a circuit for sending signals to and receiving signals from another device;
a memory for storing commit-scalar and commit-element parameters and other data; and
a processor adapted to perform operations on the signals sent to or received from the other device, the processor operating to:
generate a password element using the ECC group with a cofactor that is greater than one;
multiply the password element by a cofactor to generate a modified password element;
verify that the modified password element is not equal to a point at infinity, O, for the ECC group;
generate a temporary secret value;
generate the commit-element parameter using the temporary secret value and the modified password element; and
create a commit message comprising the commit-scalar parameter and the commit-element parameter.

6. The device of claim 5, the processor further operating to:
if the modified password element is equal to the point at infinity, O, for the ECC group, then generate a new password element for the station;
multiply the new password element by the cofactor to generate a new modified password element; and
verify that the new modified password element is not equal to the point at infinity, O.

7. The device of claim 5, the processor further operating to:
receive a commit-scalar parameter and a commit-element parameter from another device running the password authenticated key exchange protocol;
multiply the received commit-element parameter by the cofactor to obtain a product;
compare the product to the point at infinity for the ECC group;
if the product is equal to the point at infinity, then discard the received commit-scalar and commit-element parameters; and
if the product is not equal to the point at infinity, then generate a confirm message, a key confirmation key, and a pairwise master key using the received commit-scalar and commit-element parameters.

8. A device running a password authenticated key exchange protocol using an Elliptic Curve Cryptography (ECC), comprising:
a circuit for sending signals to and receiving signals from another device;
a memory for storing commit-scalar and commit-element parameters and other data; and
a processor adapted to perform operations on the signals sent to or received from the other device, the processor operating to:
generate a password element for a station using the ECC group, the ECC group selected to have an order that is a prime and a cofactor that is equal to one;
generate a temporary secret value;
generate a commit-element parameter using the temporary secret value and modified password element;
generate a commit-scalar parameter; and
create a commit message comprising the commit-scalar parameter and the commit-element parameter.

* * * * *